US008873385B2

(12) United States Patent
Wu et al.

(10) Patent No.: US 8,873,385 B2
(45) Date of Patent: Oct. 28, 2014

(54) INCAST CONGESTION CONTROL IN A NETWORK

(75) Inventors: Haitao Wu, Beijing (CN); Chuanxiong Guo, Jiangsu (CN); Yongguang Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 417 days.

(21) Appl. No.: 12/961,856

(22) Filed: Dec. 7, 2010

(65) Prior Publication Data

US 2012/0140621 A1 Jun. 7, 2012

(51) Int. Cl.

| | |
|---|---|
| ***H04L 12/28*** | (2006.01) |
| ***H04L 29/06*** | (2006.01) |
| *H04J 1/16* | (2006.01) |

(52) U.S. Cl.

CPC .................................... *H04L 69/163* (2013.01)

USPC ............................ 370/230; 370/252; 370/442

(58) Field of Classification Search

USPC ............. 370/229, 230.1, 235.1, 236, 395.51, 370/395.52, 252, 230–235, 442; 709/230, 709/232, 235; 714/748, 749

See application file for complete search history.

(56) References Cited

U.S. PATENT DOCUMENTS

| | | | | |
|---|---|---|---|---|
| 5,163,046 | A | 11/1992 | Hahne et al. | |
| 6,201,791 | B1 * | 3/2001 | Bournas | 370/234 |
| 6,370,114 | B1 | 4/2002 | Gullicksen et al. | |
| 7,054,317 | B1 | 5/2006 | Jung et al. | |
| 7,145,887 | B1 * | 12/2006 | Akgun et al. | 370/321 |
| 7,656,800 | B2 | 2/2010 | Morandin | |
| 7,684,332 | B2 * | 3/2010 | Ray et al. | 370/235 |
| 7,778,164 | B2 * | 8/2010 | Shimonishi | 370/229 |
| 8,098,579 | B2 * | 1/2012 | Ray et al. | 370/230 |
| 2005/0071451 | A1 * | 3/2005 | Key et al. | 709/223 |
| 2010/0226250 | A1 * | 9/2010 | Plamondon | 370/230 |
| 2011/0013516 | A1 * | 1/2011 | Black et al. | 370/236 |
| 2014/0029430 | A1 * | 1/2014 | Samuels et al. | 370/235 |

OTHER PUBLICATIONS

Alizadeh, et al., "DCTCP: Efficient Packet Transport for the Commoditized Data Center", retrieved on Aug. 17, 2010 at <<http://research.microsoft.com/pubs/121386/dctcp-public.pdf>>, ACM SIGCOMM, New Delhi, India, Aug. 2010, pp. 1-15.

Floyd, et al., "Random Early Detection Gateways for Congestion Avoidance", retrieved on Aug. 17, 2010 at <<http://www.cs.princeton.edu/courses/archive/fall06/cos561/papers/red.pdf>>, IEEE/ACM Transactions on Networking, vol. 1, No. 4, Aug. 1993, pp. 397-413.

(Continued)

*Primary Examiner* — John Pezzlo

(74) *Attorney, Agent, or Firm* — Dan Choi; Judy Yee; Micky Minhas

(57) ABSTRACT

Implementations are described for controlling, avoiding, and/or minimizing incast congestion in a network. In various embodiments, the network may be a data center network, which may include one or more senders and a receiver that transmit data across the network using Transmission Control Protocol. The receiver may be associated with a receive window that may determine amount of data that may be received by the receiver at a single time. Moreover, a size of the receive window may be adjusted based at least in part on an available bandwidth of the receiver. As a result of an increase or decrease in the receive window, the one or more senders may not be constrained in transmitting data to the receiver and incast congestion at the receiver may be reduced and/or avoided.

20 Claims, 6 Drawing Sheets

GLOBAL CONNECTION 302

SLOT 304 | SLOT 306 | SLOT 308

FIRST SUB-SLOT 310 | SECOND SUB-SLOT 312 | FIRST SUB-SLOT 314 | SECOND SUB-SLOT 316 | FIRST SUB-SLOT 318 | SECOND SUB-SLOT 320

CONNECTION 322

SLOT 324 | SLOT 326 | SLOT 328

SUB-SLOT 330 | SUB-SLOT 332 | SUB-SLOT 334 | SUB-SLOT 336 | SUB-SLOT 338 | SUB-SLOT 340

CONNECTION 342

SLOT 344 | SLOT 346 | SLOT 348

SUB-SLOT 350 | SUB-SLOT 352 | SUB-SLOT 354 | SUB-SLOT 356 | SUB-SLOT 358 | SUB-SLOT 360

TIME 300

(56) References Cited

OTHER PUBLICATIONS

Ghobadi, et al., "TCP Pacing in Data Center Networks", retrieved on Aug. 17, 2010 at <<http://www.cs.utoronto.ca/~monia/publications/TR10-SN-UT-04-10-00.pdf>>, University of Toronto SNL Technical Report TR10-SN-UT-04-10-00, Oct. 4 2000, pp. 1-20.

Krevat, et al., "On Application-level Approaches to Avoiding TCP Throughput Collapse in Cluster-based Storage Systems", retrieved on Aug. 17, 2010 at <<http://www.pdl.cmu.edu/PDL-FTP/HECStorage/sc07-krevat.pdf>>, ACM, Proceedings of International Petascale Data Storage Workshop (PDSW, Supercomputing), Reno, Nevada, Nov. 2007, pp. 1-4.

Phanishayee, et al., "Measurement and Analysis of TCP Throughput Collapse in Cluster-based Storage Systems", retrieved on Aug. 17, 2010 at <<http://www.pdl.cmu.edu/PDL-FTP/Storage/FASTIncast.pdf>>, USENIX Association, Proceedings of Conference on File and Storage Technologies (FAST), San Jose, California, Article 12, Feb. 26 2008, pp. 1-14.

Vasudevan, et al., "Safe and Effective Fine-grained TCP Retransmissions for Datacenter Communication", retrieved on Aug. 17, 2010 at <<http://www.pdl.cmu.edu/PDL-FTP/Storage/sigcomm147-vasudevan.pdf>>, ACM SIGCOMM Computer Communication Review, Barcelona, Spain, 2009, pp. 303-314.

* cited by examiner

ENVIRONMENT 100
INTERNET 120
ACCESS ROUTER 118
AGGREGATE ROUTER 114
AGGREGATE ROUTER 116
AGGREGATE SWITCH 110
AGGREGATE SWITCH 112
TOR SWITCH 102
TOR SWITCH 104
TOR SWITCH 106
TOR SWITCH 108
TOR SWITCH 108
SERVER 122
SERVER 124
SERVER 126

INCAST CONGESTION CONTROL IN A NETWORK

BACKGROUND

Transmission Control Protocol (TCP) is widely used to provide reliable, ordered delivery of data from one entity to another entity. More particularly, TCP is the protocol that is frequently relied on by various Internet applications, such as, for example, the World Wide Web, e-mail, and file transfer. In a high-bandwidth and low latency network utilizing TCP, multiple servers may independently send data to a single receiver in parallel. Provided that the multiple senders simultaneously transmit data to the receiver, congestion, or incast congestion, may occur if the receiver is not capable of receiving the quantity of data being transmitted. As a result of the congestion, one or more packets of data may be lost, thus causing the server that transmitted the lost data packets to retransmit the data. Therefore, the overall performance of the system may be limited by the slowest TCP connection, which may suffer from retransmissions and timeouts due to packet loss.

SUMMARY

Described herein are techniques for adjusting a receive window to avoid and/or minimize incast congestion in a network. More particularly, in a data center network utilizing Transmission Protocol Control (TCP), the receive window associated with a receiver may be increased or decreased based on an amount of available bandwidth at the receiver. In various embodiments the receive window may also be increased in order to avoid constraining a sender in transmitting data. Moreover, the receive window may also be decreased if sufficient bandwidth is not available at the receiver, which may allow the system to avoid and/or minimize congestion at the receiver. Upon adjustment of the receive window, at least one round-trip time may occur before data reflecting to the adjusted receive window is received. In the above embodiment, the TCP receive window may be proactively adjusted prior to congestion and before packet loss occurs.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

Figure 1:
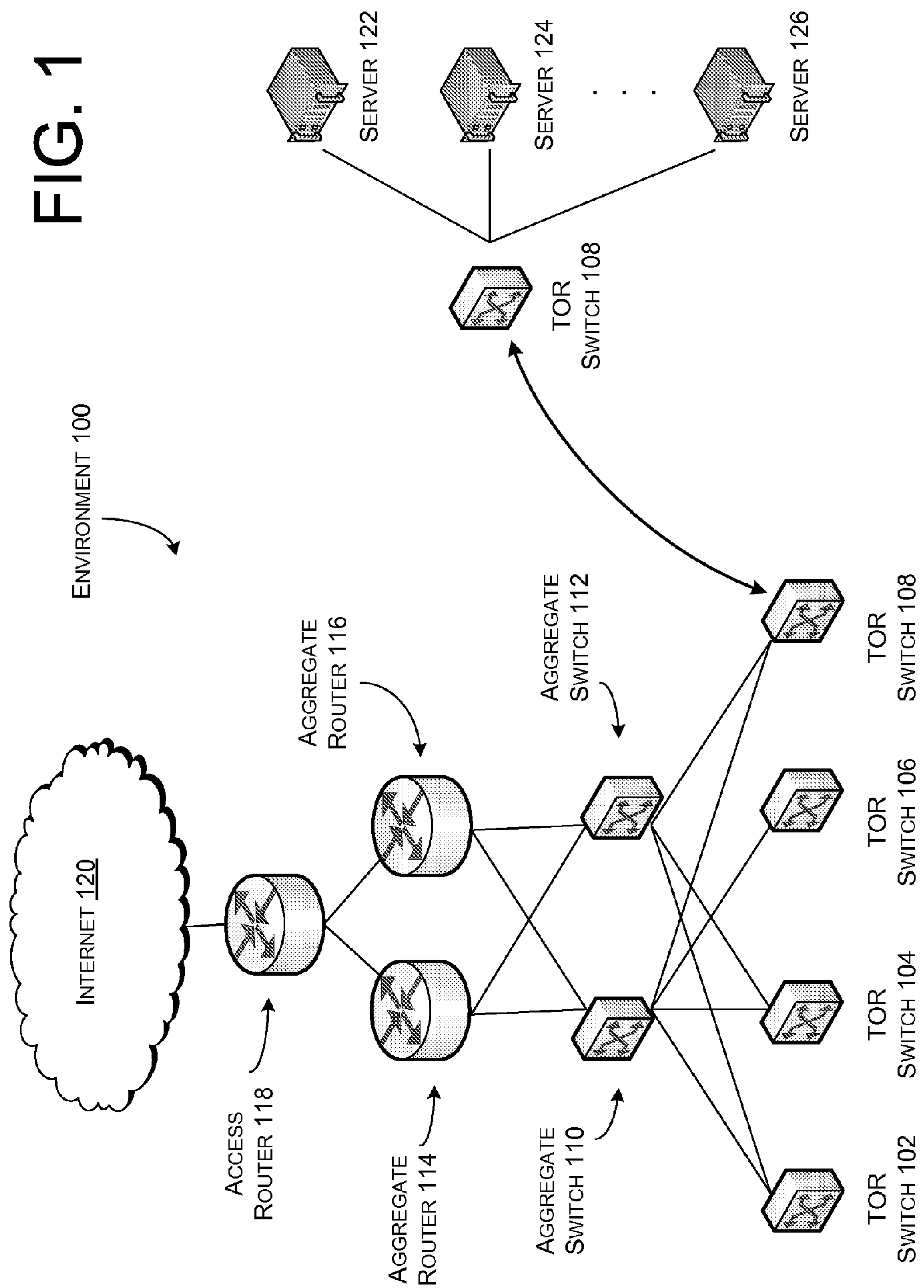
FIG. 1 illustrates a diagram showing an environment representing a data center network, in accordance with various embodiments.

Described herein are systems and/or techniques for minimizing, controlling, and/or eliminating incast congestion in a network utilizing Transmission Control Protocol (TCP). More particularly, described herein are systems and/or techniques for controlling incast congestion associated with TCP in data center networks. In various embodiments, in a network including a TCP sender and a TCP receiver, incast congestion may be avoided and/or controlled by preventing incast congestion at the TCP receiver side, which may be referred to as incast congestion control for TCP (ICTCP). Since the TCP receiver may be aware of the number of synchronized TCP connections associated with TCP sender(s), including its available bandwidth, and can adjust the receive window size of the TCP connections, the TCP receiver may be modified to minimize and/or avoid incast congestion. Utilizing this approach may avoid needing to make modifications to both the TCP sender and the TCP receiver and/or avoid solutions that require switches and router support. In addition, by modifying the TCP receiver of a network, it is contemplated that incast congestion may be avoided before packet loss occurs as opposed to focusing on recovery after packet loss.

For the purposes of this discussion, a receive window may refer to the maximal amount of data that the sender can transmit without needing to receive an acknowledgement from the receiver. Therefore, if a sender has not received an acknowledgement from a receiver upon transmitting a first data packet, TCP provides that the sender may wait to transmit a second data packet. If a wait time for receiving the acknowledgement exceeds a predetermined time, the sender may retransmit the first data packet as opposed to continually sending additional data packets to the receiver. This way, TCP may reliably ensure that data packets transmitted by the sender are actually received by the receiver. Moreover, packet loss may occur when one or more packets of data traveling across a network fail to reach their destination. For instance, provided that a sender transmitted a first data packet to a receiver, packet loss may exist if that first data packet is not received by the receiver. In this example, the sender may need to retransmit the first data packet to ensure that the receiver received this data packet.

In an example embodiment, the TCP receiver may be modified by controlling and/or modifying the receive window. That is, the size of the receive window may be modified so that it is small enough to avoid incast congestion, but also that is large enough to receive the data transmitted from the multiple TCP senders (i.e., servers) in order to maintain a desired level of performance of the system. However, it may be difficult to determine the proper size of the receive window to achieve optimal performance and efficiency. In this embodiment, the receive window may be modified by using the available bandwidth at the TCP receiver to guide congestion control. The available bandwidth at the TCP receiver may serve as a quota for increasing the receive windows at each connection. Moreover, the round trip time (RTT) may also be utilized for congestion control of each connection. In addition, the receive window adjustment may be based on the ratio of the difference of the measured and expected throughput over the expected throughput.

For the purposes of this discussion, the RTT may correspond to the amount of time it takes for the TCP sender to transmit a data packet to the TCP receiver in addition to the amount of time for the TCP sender to receive an acknowledgement indicating that the data packet was received. Moreover, throughput may refer to the average rate of successful message delivery over a particular communication channel.

Various examples of incast congestion control techniques associated with a network, in accordance with the embodiments, are described below with reference to FIGS. 1-6.

FIG. 1 illustrates a data center network structure in which an environment 100 includes Top of Rack (TOR) switches 102-108, aggregate switches 110 and 112, aggregate routers 114 and 116, an access router 118, and an Internet 120. Furthermore, FIG. 1 further illustrates an example of how one of the TOR switches 108 may be connected to a plurality of servers 122-126. However, it is contemplated that each of the TOR switches 102-108 may be similarly connected to the same plurality of servers 122-126 and/or different servers. In various embodiments, the environment 100 may represent a basic topology, at the abstract level, of a data center network. As shown, each of the TOR switches 102-108 may be connected to each of the aggregate switches 110. For instance, TOR switch 102 may be connected to both aggregate switch 110 and aggregate switch 112. Moreover, each of the aggregate switches 110 and 112 may also be connected to each of the aggregate routers 114 and 116, which may be connected to the access router 118. Lastly, the access router 118 may be connected to the Internet 120. It is contemplated that any number of TOR switches 102-108, aggregate switches 110 and 112, aggregate routers 114 and 116, and access routers 118 may be present in the environment 100.

In various embodiments, a network data center may be a facility used to house computer systems and associated components, such as the TOR switches 102-108, the aggregate switches 110 and 112, the aggregate routers 114 and 116 and/or the access router 118, for example. Moreover, the TOR switches 102-108 may refer to small port count switches that are situated on the top or near the top of a rack included in a network data center. In addition, the aggregate switches 110 and 112 may be used to increase the link speed beyond the limits of any one single cable or port.

As stated above, each of the TOR switches 102-108 may be connected to a plurality of servers 122-126. Although three servers 122-126 are shown in FIG. 1, it is contemplated that each TOR switch 102-108 may be connected to any number of servers 122-126. In this embodiment, TOR switch 108 is representative of the other TOR switches 102-106 and it may be directly connected to servers 122-126. The TOR switch 108 may be connected to dozens of servers 122-126. In one embodiment, the number of servers 122-126 under the same TOR switch 108 is from 44 to 48, and the TOR switch 108 is a 48-port Gigabit switch with one or multiple 10 Gigabit uplinks.

In the environment 100, such as a network data center, files may be stored at multiple servers 122-126. Incast congestion may occur when a file, or a portion thereof, is fetched from multiple of the servers 122-126. More specifically, incast congestion may occur when multiple senders (i.e., servers 122-126) operating under the same TOR switch 102-108 send data to a single receiver either simultaneously or at approximately the same time. In various embodiments, the receiver may include any type of server and/or computing device. Even if the senders simultaneously transmit data to the receiver, if the amount of data transmitted by each sender is relatively small, incast congestion may be avoided. However, when the amount of data transmitted by the senders cannot be received by the receiver, throughput may decline and data packets that were transmitted by a sender may be lost and, therefore, not received by the receiver. That is, throughput may be decreased due to one or more TCP connections experiencing time out caused by data packet drops and/or loss.

For instance, assume that the environment 100 includes ten servers 122-126 and an allocator that assigns one or more of the servers 122-126 to provide data in response to a request for that data. In various embodiments, if the servers 122-126 send their respective data packets to a receiver at approximately the same time, the receiver may not have available bandwidth to receive the data packets (i.e., incast congestion). As a result, data packets may be lost and the server 122-126 that transmitted the lost data packet(s) may need to retransmit those data packets. Accordingly, provided that the receiver requested a particular piece of data from the servers 122-126, the receiver may need to wait for the lost data packet to be retransmitted in order to receive the data responsive to the request. That is, the performance of the environment 100 may be dependent upon the TCP connections between the servers 122-126 and the receiver. Therefore, the time associated with retransmitting the lost data packets may cause unneeded delay in the environment 100.

Figure 2:
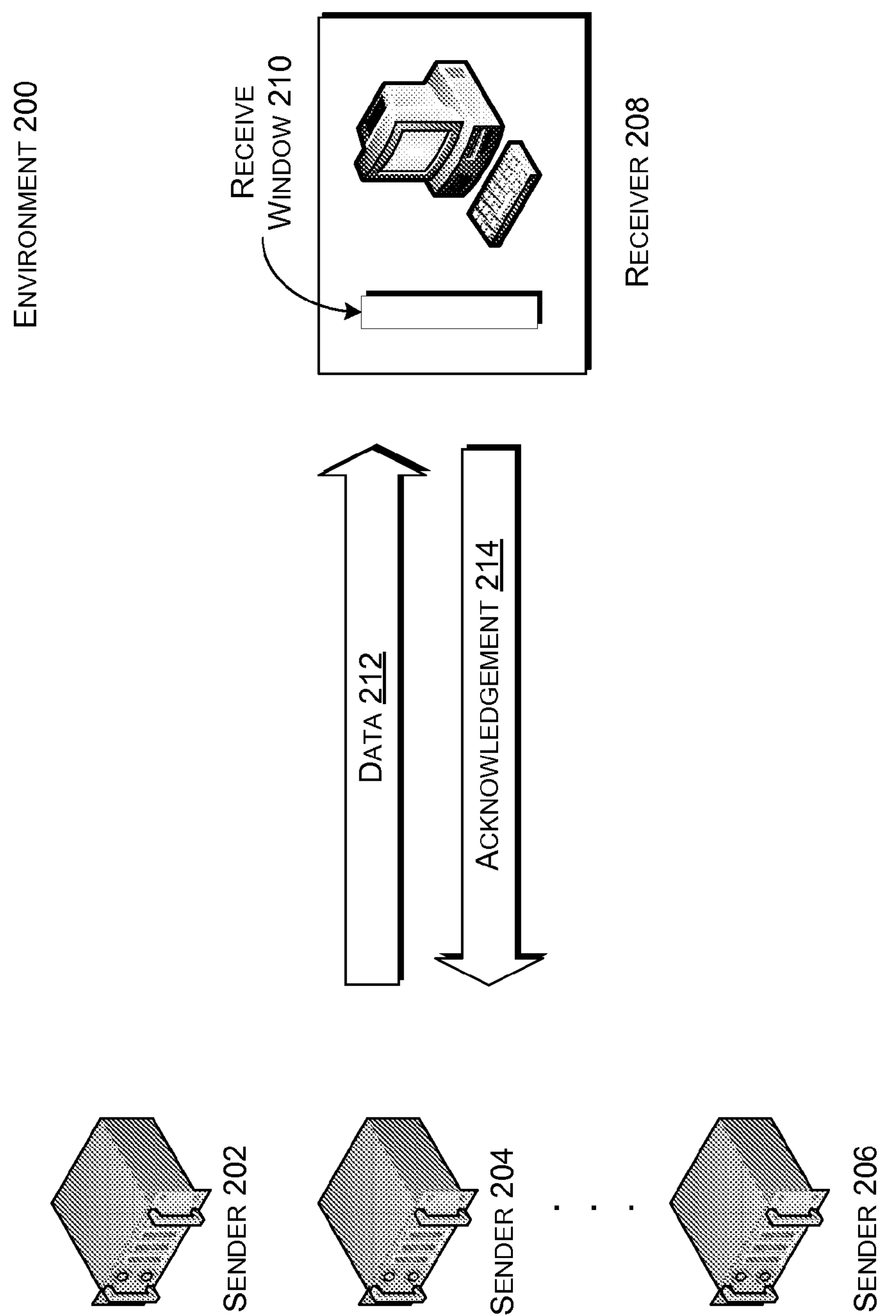
FIG. 2 illustrates a diagram showing adjusting a receive window of a receiver based on data received from one or more senders, in accordance with various embodiments.

FIG. 2 illustrates a diagram showing an environment for transmitting data between one or more senders and a receiver. More particularly, an environment 200 includes a plurality of senders 202-206 and a receiver 208, which includes a receive window 210. The senders 202-206 may correspond to the servers 122-126 described with respect to FIG. 1 and may be included within a network data center. Moreover, the sender 202-206 may be any other entity that is capable of transmitting any type of data. It is contemplated that any number of senders 202-206 may be included in the environment 100. As stated above, the receiver 208 may also refer to a server or any type of computing device and may be in communication with the network directly, such as via the Internet, etc. As stated above, the receiver 208 includes an associated receive window 210 that will be described in additional detail below.

In various embodiments, one or more of the senders 202-206 may transmit data 212 to the receiver 208. The data 212 may be transmitted in response to a request from the receiver 208. Moreover, the data 212 may consist of one or more data packets. Provided that a particular data packet was actually received by the receiver 208, an acknowledgement (ACK) 214 may be transmitted from the receiver 208 to the sender 202-206 that transmitted the received data packet. The ACK 214 may indicate to a particular one of the senders 202-206 that transmitted data 212 was received by the receiver 208. In one embodiment, the ACK 214 may also indicate to the sender 202-206 the size of the receive window 210 associated with the receiver 208. Based at least in part on the ACK 214, the sender 202-206 may know how much data 212 it can transmit to the receiver 208.

The receive window 210 (or the "TCP receive window) may be implemented in the environment 200 to manage flow control of the data 212 being transmitted from the sender 202-206 to the receiver 208. For instance, the receive window 210 may prevent a sender 202-206 having a faster TCP connection from overflowing the receiver's 208 buffer. In one embodiment, the receive window 210 size may determine the maximum number of bytes (i.e., data 212) that the sender 202-206 can transmit to the receiver 208 without receiving an ACK 214 from the receiver 208. As stated above, the receive window 210 may be modified and/or adjusted depending on the available bandwidth of the receiver 208.

In example embodiment, as the number of senders 202-206 increases, the throughput of the environment 200 may decrease. That is, since an increase in the number of senders 202-206 may also lead to an increase in the amount of data 212 being transmitted to the receiver 208, incast congestion may occur if the receive window 210 of the receiver 208 has not been adjusted accordingly. If multiple senders 202-206 transmit data 212 in parallel, congestion may occur at the receiver 208. This congestion may even occur if a large number of the senders 202-206 each transmit a small amount of data 212. Likewise, congestion may also occur if only a few the senders 202-206 each transmit a large amount of data in parallel. As stated above, this congestion may hinder the performance of the environment 200.

As mentioned previously, the receive window 210 may be utilized to manage and/or control flow control between one or more of the senders 202-206 and the receiver 208. In particular, the receive window 210 may prevent a sender 202-206 having a faster TCP connection from overwhelming a receiver 208 having a relatively slower TCP connection. The receive window 210 may also reflect the amount of data 212 that the sender 202-206 can transmit to the receiver 208 without waiting for the ACK 214 from the receiver 208. The ACK 214 may confirm to the sender 202-206 that various transmitted data packets were in fact received. Once the ACK 214 is received by the sender 202-206, the sender 202-206 may then continue to transmit additional data 212 to the receiver 208.

In various embodiments, when the receive window 210 is increased, the RTT may also increase provided that the receiver 208 has adequate available bandwidth to receive the data 212. An increase in the receive window 210 may mean that additional data packets may be transmitted from one or more of the senders 202-206 to the receiver 208 at the same time. Therefore, by controlling the size of the receive window 210, the rate at which the senders 202-206 can transmit the data 212 to the receiver 208 can be controlled. The size of the receive window 210 may be adjusted in a many (i.e., the senders 202-206) to one (i.e., the receiver 208) network based on the number of senders 202-206 and the amount of data being transmitted by the senders 202-206. If the receive window 210 is not adjusted, the receive window 210 and the receiver 208 may be overwhelmed by the amount of data 212 transmitted by the senders 202-206 or the environment 200 may become constrained.

For instance, assume that forty different servers 202-206 may transmit data 212 to the receiver 208. If the receive window 210 is set to twenty, the receiver 208 may then receive a large amount of data 212 (i.e., 40 servers×20 receive window=800 data packets). Since the receiver 208 may not have the available bandwidth to receive this quantity of data 212, transmitting this amount of data 212 may cause packet loss, which may then lead to retransmission of the lost packets. On the other hand, if the receive window 210 is set to one, the receiver 208 may receive a much smaller amount of data 212 (i.e., 40 servers×1 receive window=40 data packets) from the senders 202-206. It is likely that the receiver 208 would be able to receive this amount of data 212, which would avoid incast congestion and would allow an increase in efficiency and/or performance of the environment 200. However, if the receive window 210 remained at one but only five senders 202-206 were connected to the receiver 208, a very small amount of data may be transmitted by the senders 202-206 in parallel (i.e., 5 servers×1 receive window=5 data packets). In this example, the environment 200 may be constrained by the small receive window 210.

Therefore, in high-bandwidth and low-latency data center networks, adjusting the receive window 210 at the receiver 208 to avoid incast congestion may significantly reduce TCP time-out, packet loss, and/or unnecessary re-transmissions of the lost data packets. However, since an overly controlled receive window 210 may constrain TCP performance and a less controlled receive window 210 may not adequately prevent incast congestion, the appropriate receive window 210 size maybe determined. Although the receive window 210 may be increased when a low number of senders 202-206 are present, and the receive window 210 may be decreased when an increased number of senders 202-206 may transmit data 212, it may be difficult for the receiver 208 to determine the number of senders 202-206, the number of active TCP connections, and/or the amount of data 212 that will be transmitted to the receiver 208. As a result, the receiver 208 may dynamically and/or adaptively adjust the receive window 210 based on information known to the receiver 208.

In order to adaptively adjust the receive window 210 to avoid incast congestion and a constrained network, the available bandwidth at the receiver 208 may be considered. Since incast congestion may occur at the last-hop before the data 212 arrives at the receiver 208, the receiver 208 may detect receiving throughput burstiness and control the throughput to avoid potential incast congestion. That is, the available bandwidth at the receiver 208 may be used to predict the amount of data 212 that is to be received and to subsequently adjust the receive window 210. In one embodiment, if the receiver 208 has sufficient available bandwidth, the receive window 210 may be increased so that additional data 212 can be received. Otherwise, the senders 202-206 may be constrained by the relatively small receive window 210. For example, assume that the overall capacity of the receiver 208 is one gigabyte (GB) and the receiver 208 is currently utilizing 100 megabytes (MB). Since the receiver 208 has 900 MB in available bandwidth, the receive window 210 may be increased.

On the contrary, if the receiver 208 has a relatively small amount of available bandwidth, the receiver 208 may decrease the size of the receive window 210. If the receive window 210 remained at the same size, incast congestion may occur if one or more of the senders 202-206 transmitted data 212 that exceeded the available bandwidth of the receiver 208. For instance, using the above example, if the receiver is utilizing 800 MB of the one GB of bandwidth, the receiver 208 would have approximately 200 MB as available bandwidth. In this example, the receive window 210 of the receiver 208 may be decreased to avoid incast congestion. Accordingly, as described above, the available bandwidth of the receiver 208 may be utilized to make predictions regarding whether to increase or decrease the size of the receive window 210.

Moreover, if the receiver 208 determines that the receive window 210 is to be increased, the receiver 208 may also predict whether there is sufficient available bandwidth to support the increase. More particularly, before increasing the size of the receive window 210, the receiver 208 may first make a prediction regarding the amount of data 212 that is expected to be received from one or more of the senders 202-206. The receiver 208 may make this prediction to ensure that the data 212 to be received does not exceed the available bandwidth of the receiver 208. In addition, the receive window 210 increase of all the connections between the receiver 208 and the senders 202-206 may be jointly considered.

In addition to determining the available bandwidth at the receiver 208, the frequency in which the receive window 210 is adjusted may be determined according to a feedback-loop delay. More particularly, the congestion control dynamics of a TCP connection may be regarded as a control system, where the feedback delay is the RTT of that TCP connection. When the receive window 210 is adjusted, it may take at least one RTT before the data packets following the newly adjusted receive window 210 arrive. Therefore, the control interval may be larger than one RTT time between the sender 202-206 and the receiver 208, which may change dynamically based on a queuing delay and system overhead.

That is, it is contemplated that when the receive window 210 is adjusted, at least one RTT will pass before the adjustment will take effect. As stated above, the RTT time in the environment 200 may be the amount of time it takes the sender 202-206 to send the data 212 to the receiver 208, the receiver 208 to receive the data 212 and transmit the ACK 214, and for the sender 202-206 to receive the ACK 214. Therefore, once the receiver 208 adjusts the receive window 210, the sender 202-206 will not be aware of the receive window 210 adjustment until the sender 202-206 receives the ACK 214 indicating the size of the new receive window 210. Accordingly, after the receive window 210 is changed, the time in which the receiver 208 receives data 212 according to the new receive window 210 is at least one RTT later.

Furthermore, the receive window 210 based scheme may also adjust the receive window 210 according to both link congestion status and application requirement. That is, the receive window 210 may not restrict TCP throughput when the receiver 208 has available bandwidth and the receive window 210 may throttle TCP throughput before incast congestion occurs. In one embodiment, assume that the receive window 210 was increased to a large value but was not decreased after the application requirement no longer applies. In this example, if the application resumes, congestion may occur due to the amount of traffic (i.e., data 212) received at such a large receive window 210. Therefore, the receiver 208 may differentiate whether a receive window 210 over-satisfies the achieved throughput on a TCP connection and, if so, the receiver 208 may decrease the size of the receive window 210.

As stated above, the receiver 208 may determine whether or not to adjust the receive window 210 and if so, to what extent, based on the available bandwidth at the receiver 208. Moreover, the available bandwidth may be used to predict how to increase or decrease the receive window 210 and/or to predict whether incast congestion will occur. In one embodiment, the available bandwidth may be computed using an algorithm described herein. More particularly, the following algorithm (Equation 1) may be used to determine the available bandwidth ($BW_A$) on an interface at the receiver 208:

$$BW_A=\max(0,\alpha*C-BW_T) \quad (1)$$

In the above equation, assume that C is the link capacity of the interface on the receiver 208. Moreover, the bandwidth of total incoming traffic observed on that interface may be defined as $BW_T$, which may include all types of packets such as, for example, broadcast, multicast, unicast of UDP, or TCP, etc. Moreover, $\alpha\in[0,1]$ may be a parameter that absorbs potential oversubscribed bandwidth during receive window 210 adjustment. It is contemplated that this value may be set to any integer or number.

Therefore, as shown above, the available bandwidth $BW_A$ of the receiver 208 may be determined by subtracting the observed traffic (i.e., data 212 received by the receiver 208) from the maximum bandwidth of the receiver 208. The available bandwidth $BW_A$ may be used as a quota for all incoming TCP connections to increase the receive window 208 for increased throughput. Each receiver 208 may estimate the potential throughput increase prior to increasing the size of its corresponding receive window 210. When there is sufficient quota ($BW_A$), the receive window 210 may be increased, and the corresponding quota may be consumed to prevent bandwidth oversubscription. However, in various embodiments, since data 212 is continuously received from the senders 202-206, the available bandwidth may be determined for a particular period of time.

Figure 3:
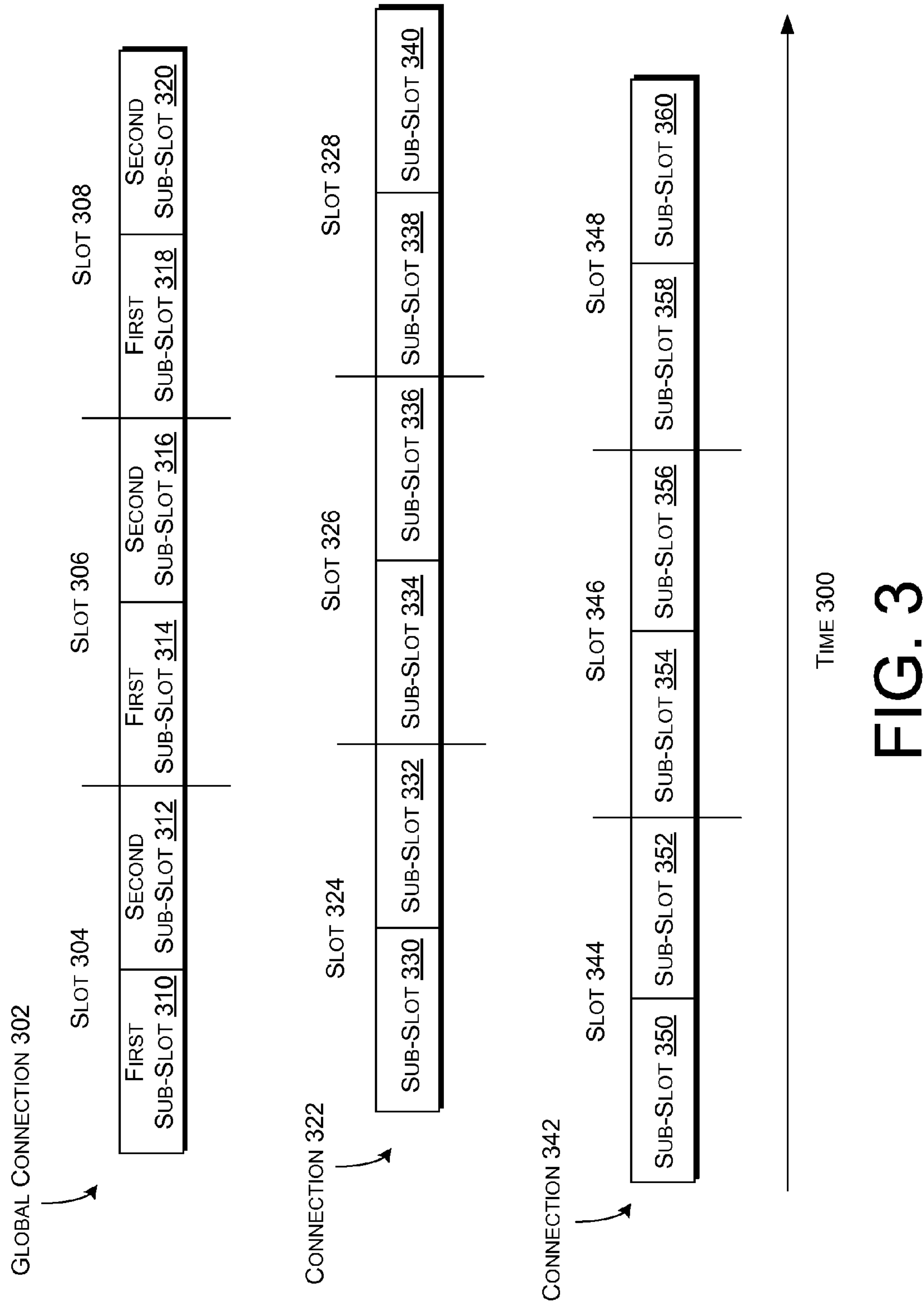
FIG. 3 illustrates a diagram showing using a slotted time system to determine an available bandwidth of a receiver and adjusting a receive window based on the available bandwidth, in accordance with various embodiments.

FIG. 3 illustrates a diagram showing a time slot system for determining the available bandwidth of a TCP receiver and determining whether a size of a TCP receive window associated with the TCP receiver is to be adjusted. In various embodiments the TCP receiver may correspond to receiver 208 and the receive window may correspond to receive window 210. As shown, FIG. 3 illustrates a slotted time system in which time 300 extends from left to right and time 300 may correspond to a particular period of time in which traffic is received by the receiver 208. Moreover, the time 300 associated with a global connection 302 may be divided into a plurality of slots 304, 306, and 308. Each slot 304-308 may also be divided into sub-slots. For instance, slot 304 may be divided into a first sub-slot 310 and a second sub-slot 312, slot 306 may be divided into a first sub-slot 314 and a second sub-slot 316, and slot 308 may also be divided into a first sub-slot 318 and a second sub-slot 320. It is contemplated that the time 300 may be divided into any number of slots 304-308 and/or sub-slots 310-320. For the purposes of this discussion, the global connection 302 may denote slot allocation for available bandwidth estimation on a network interface at the receiver.

Moreover, FIG. 3 also illustrates connection 322 that includes time slots 324-328 and connection 342, which includes slots 344-348. Furthermore, with respect to connection 322, slot 324 includes sub-slots 330 and 332, slot 326 includes sub-slots 334 and 336, and slot 328 includes sub-slot 338 and 340. In addition, regarding connection 342, slot 344 includes sub-slots 350 and 352, slot 346 includes sub-slots 354 and 356, and slot 348 includes sub-slots 358 and 360. In various embodiments, connection 322 and connection 342 may each correspond to individual connections at the receiver. In addition, connections 322 and 342 may also be referred to as connection i and connection j, respectively.

More particularly, with respect to the global connection 302, to estimate the available bandwidth on the interface at the receiver 208 and to provide a quota for a subsequent receive window 210 increase (or decrease), the time 300 may be divided into the slots 304-308. As shown in FIG. 3, each slot 304-308 may consist of two sub-slots, a first sub-slot and a second sub-slot, with each sub-slot having the same length (T). For each network interface at the receiver 208, the traffic received in the first sub-slot 310, 314, and 318 is measured and this observed traffic is used to calculate the available bandwidth as the quota for a potential receive window 210 increase at the second sub-slot 312, 316, and 320.

In one embodiment, the determination of whether to increase the receive window 210 associated with the receiver 208 may be based on the amount of traffic received and/or observed at the first sub-slot (310, 314, and/or 318). For example, with respect to slot 304, the receiver 208 may first determine the amount of traffic (i.e. data 212) received during the first sub-slot 310. Since the receiver 208 is aware of the overall bandwidth of the receiver 208, the available bandwidth of the first sub-slot 310 may be determined by computing the difference between the overall bandwidth of the receiver 208 and the observed traffic at the end of the first sub-slot 310. Moreover, by determining the available bandwidth at the end of the first sub-slot 310, the receiver 208 may then predict the available bandwidth for the second sub-slot 312. In various embodiments, because the receiver 208 may not know how much traffic will be received during the second sub-slot 312, the receiver 208 may be limited to making a prediction of the available bandwidth for the second sub-slot 312.

Based on the predicted available bandwidth for the second sub-slot 312, the receiver 208 may then determine whether, and how much, the receive window 210 may be increased for the second sub-slot 312. When the receiver 210 determines that there is sufficient available bandwidth at the second sub-slot 312, the receive window 210 at the second sub-slot 312 may be increased. In an example embodiment, it is contemplated that the receive window 210 may be decreased at any time (i.e., if the available bandwidth is low, etc.). However, in this embodiment, the receive window 210 may be increased at the second sub-slot 312 but not in the first sub-slot 310 since the available bandwidth may be unknown at the first sub-slot 310. Therefore, in order to properly adjust the receive window 210, the available bandwidth of the receiver 208 may be computed at the end of each first sub-slot (310, 314, and/or 318) so that the receive window 210 may be increased during the second sub-slot (312, 316, and/or 320). If this determination is not made, the receiver 208 may be unable to adjust the receive window 210 at the second sub-slot (312, 316, and/or 320). This process may be performed for each time slot 304-308 illustrated in FIG. 3.

For example, regardless of whether the receive window 210 is adjusted in second sub-slot 312, the receiver 208 may then calculate the available bandwidth at the end of first sub-slot 314 of slot 306. Based on this available bandwidth, a predicted available bandwidth may also be determined for second sub-slot 316 and the receive window 210 for second sub-slot 316 may be adjusted accordingly. This process may again be performed for slot 308 and any subsequent slots not illustrated in FIG. 3. Therefore, the available bandwidth or quota may be updated at the end of each first sub-slot (310, 314, and/or 318) and once this occurs, the receive window 210 at the second sub-slot (312, 316, and/or 320) may be increased if the second sub-slot (312, 316, and/or 320) is predicted to have sufficient available bandwidth. Moreover, the total estimated increased throughput of all connections in each of the second sub-slots (312, 316, and/or 320) may be less than the available bandwidth observed in each of the first sub-slots (310, 314, and/or 318). It is also contemplated that, although the receive window 210 may be decreased at any time, a decrease in any receive window 210 does not increase the quota, which will be reset by incoming traffic in the next first sub-slot (310, 314, and/or 318).

As stated above, FIG. 3 may illustrate a global slot allocation for available bandwidth estimation on a network interface (i.e., global connection 302), meaning that each of the connections associated with the receiver 208 are considered. However, the process described above may also be performed for each TCP connection associated with the network interface. For instance, connection 322 and connection 342 may represent individual TCP connections associated with the network interface. As shown in FIG. 3, connection 322 and connection 342 may be divided into time slots 324-328 and 344-348, respectively. In various embodiments, the global connection 302 may be independent from any individual connections, such as connection 322 and/or connection 342, for example. Moreover, the time slots (i.e., 324-328, 344-348, etc.) for all the connections (322, 342, etc.) may also be independent from one another.

In ICTCP, each TCP connection (322, 342, etc.) may adjust the size of its corresponding receive window 210 when an ACK 214 is transmitted from that connection. In an effort to avoid wasting traffic, additional TCP ACK 214 may be limited to being sent when a receive window 210 is adjusted. For a TCP connection, after the ACK 214 is sent out, the data packet corresponding to that ACK 214 may arrive one RTT later. Therefore, although each of the connections (322, 342, etc.) have their own independent RTT, the amount of delay before an adjusted receive window 210 may take effect is one RTT for each TCP connection.

Meanwhile, to estimate the throughput of a TCP connection for the receive window 210 adjustment, the shortest time scale is an RTT for that connection. That is, since it may take one RTT to for the receive window 210 to take effect, and it may take another RTT to determine the throughput for the connection having the adjusted receive window, measuring the throughput associated with the new receive window 210 may amount to two RTT's. Therefore, the control interval for a TCP connection may be two RTT's since one RTT may be needed for the adjusted receive window 210 to take effect, and one additional RTT may be needed to measure the achieved throughput with that newly adjusted receive window 210. In this embodiment, the receive window 210 adjustment interval may be performed per connection. As stated above, the receive window 210 adjustment for each connection may be independent of the other connections.

Moreover, each time slot 304-308 may include two sub-slots 310-320 having the same length (T). In an example embodiment, the relationship of sub-slot length T and any flow's control interval is described below. Since the available bandwidth estimation on the first sub-slot (310, 314, and 318) may be to provide a quota for the receive window 210 adjustment on the second sub-slot (312, 316, and 320), the length T may be determined by the control intervals of each of the connections. In this embodiment, a weighted averaged RTT of all TCP connections (i.e., the global connection 302) may be defined as T. That is, the sub-slot time of the global connection 302 may be an averaged RTT for all of the connections on the network interface. For instance, the length of T for the global connection 302 may be defined in Equation 2:

$$T=\Sigma_i w_i \mathrm{RTT}_i, \tag{2}$$

in which the weight $w_i$ of connection i is the traffic volume of connection i, where normalized means that the total traffic is assumed to be one.

In addition, the relationship of any single TCP connection i/j, such as connection 322 and/or connection 342, with $\mathrm{RTT}_{i/j}$ and the system estimation sub-interval T may also be determined. That is, for each sub-slot (i.e., 330-340 and/or 350-360) of an individual connection (i.e., 322 and/or 342), the sub-slot time for that connection is its RTT. In various embodiments, each connection (i.e., 322 and/or 342) may adjust the size of its receive window 210 based on its observed RTT. For example, for any TCP connection (i.e., 322 and/or 342), if the time is in the second sub-slot (i.e., 332, 336, 340, 352, 356, and/or 360) of a particular slot (i.e., 324-328), and it is observed that the past time is larger than two RTT's since the last receive window 210 adjustment, the receive window 210 may be increased based on the newly observed TCP throughput and the current available bandwidth.

As mentioned previously, the receiver 208 may determine whether to adjust the receive window 210 based on the available bandwidth at the receiver 208. However, the receiver 208 may also need to determine whether to increase or decrease the receive window 210 and the degree of the increase/decrease. In various embodiments, for any ICTCP connection, the receive window 210 may be adjusted based on its incoming measured throughput (denoted as $b^m$) and its expected throughput (denoted as $b^e$). The measured throughput may represent the achieved and/or observed throughput on a TCP connection. Moreover, the expected throughput may represent an expectation of the throughput on that TCP connection if the throughput is constrained by the receive window 210 size.

After determining the expected throughput and the measured throughput for a given connection, the size of the receive window 210 may be increased when the difference of the ratio of measured and expected throughput is small while the receive window 210 may be decreased when the difference in the above ratio is larger. More particularly, when the expected throughput and the measured throughput are approximately the same, the receive window 210 may be increased because the connection has yet to obtain its expected throughput. Therefore, incast congestion for this connection is unlikely and if the receive window 210 is not increased, the sender(s) 202-206 may be constrained. However, if there is a relatively large difference between the measured and expected throughputs such that the expected throughput is much larger than the measured throughput, the sender is likely to receive additional data 212 from the senders 202-206. Therefore, the receive window 210 can likely be decreased to avoid incast congestion.

Alternatively, when the difference between the expected and measured throughputs is not too large or too small, the receive window 210 may remain the same size. It is contemplated that the difference in expected and measured throughputs that cause the receive window 210 to be increased or decreased may vary based on the TCP connection. In one embodiment, a threshold for determining whether the receive window 210 is to be increased, decreased, or not changed may be established. Accordingly, ICTCP may set the receive window 210 of a TCP connection to a value that represents its current application's requirement. An oversized receive window 210 may be a hidden problem as the throughput of that connection may reach the expected throughput at any time, and the corresponding traffic surge may overflow the switch buffer, causing incast congestion.

In an example embodiment, the measured throughput $b_i^m$ for a particular connection i may be obtained and updated for every RTT on connection i (i.e., connection 322). Moreover, for each RTT on connection i (i.e., connection 322), a sample of the current throughput, denoted as $b_i^s$, may be obtained and calculated as a total number of received bytes divided by a time interval $RTT_i$. The throughput may be smooth measured using an exponential filter, as shown in Equation 3:

$$b_{i,new}^m = \max(b_i^s, \beta * b_{i,old}^m + (1-\beta) * b_i^s) \quad (3)$$

As shown, the max procedure may cause $b_i^m$ to be updated quickly if the receive window 210 is increased, especially when receive window 210 is doubled. The expected throughput of connection i (i.e., connection 322) is obtained using Equation 4:

$$b_i^e = \max(b_i^m, rwnd_i / RTT_i) \quad (4)$$

where $rwnd_i$ and $RTT_i$ may be the receive window 210 and the RTT for connection i (i.e., connection 322), respectively. The max procedure described above may be utilized to ensure that $b_i^m \le b_i^e$.

The ratio of throughput difference $d_i^b$ may be defined as the ratio of throughput difference of measured and expected throughput over the expected throughput for connection i (i.e., connection 322), which is shown in Equation 5:

$$d_i^b = (b_i^e - b_i^m) / b_i^e \quad (5)$$

By definition, $b_i^m \le b_i^e$, and thus $d_i^b \in [0,1]$.

In an example embodiment, two thresholds $\gamma_1$ and $\gamma_2$ ($\gamma_2 > \gamma_1$) may be utilized to differentiate at least three different embodiments for the receive window 210 adjustment. The first embodiment is described below in Equation 6:

$$d_i^b \le \gamma_1 \text{ or } d_i^b \le MSS_i / rwnd_i \quad (6)$$

In this embodiment, the receive window 210 may be increased if the available bandwidth has been computed for the first sub-slot 310 and the available bandwidth for the second sub-slot 312 has also been predicted. Therefore, if the above determinations have been made and there is sufficient quota of available bandwidth on the network interface, the size of the receive window 210 may be increased. Moreover, the quota may be decreased accordingly if the receive window 210 has been previously increased.

In a second embodiment, if $d_i^b > \gamma_2$, the receive window 210 may be decreased by one maximum segment size (MSS), for example, if this condition holds for three continuous RTTs. For the purposes of this discussion, the MSS may refer to the largest amount of data, specified in bytes, that a computer or communications device can receive in a single, unfragmented piece. In this embodiment, the minimal receive window 210 may be two MSS. In a third embodiment, if the first and second embodiment do not apply, the current size of the receive window 210 may be maintained.

Moreover, the size of the receive window 210 may be increased in a variety of different ways. More particularly, the increase of the receive window 210 on any one ICTCP connection may consist of two phases: slow start and congestion avoidance. In the slow start phase, the receive window 210 may be doubled if there is sufficient quota (i.e., available bandwidth). In contrast, in congestion avoidance, the receive window 210 may only be increased by one MSS. In various embodiments, if the expected throughput and the measured throughput, are either the same or slightly different, the receive window 210 may be increased using the slow start phase. The receive window 210 may be increased since there would then be bandwidth available to receive additional data packets. Otherwise, the receive window 210 may be increased utilizing the congestion avoidance phase. The congestion avoidance phase may be utilized if the receiver 208 does not have sufficient available bandwidth.

In another embodiment, fairness between multiple TCP connections with respect to sharing bandwidth fairly may also be considered when adjusting the receive window 210 and/or when data 212 is transmitted from a sender 202-206 to the receiver 208. Considering that multiple TCP connections established at the same time may typically be transmitting data associated with the same job in a data center network, fair sharing of the TCP connections may be achieved without sacrificing throughput. Further, it is appreciated that fairness between TCP flows may be independent of a receive window 210 adjustment for incast congestion avoidance.

In the above embodiment, the receive window 210 maybe adjusted to achieve fairness for incoming TCP connections with low-latency on two folds. For a receive window 210 decrease, the receive window 210 may be decreased by one MSS for a half of all TCP connections. The half of the TCP connections that are selected may be the TCP connections that have a receive window 210 that is larger than the average receive window 210 value of all the TCP connections. That is, in order to achieve fairness between the TCP connections, the receive window 210 may be decreased for connections that have a larger receive window 210. Moreover, for a receive window 210 decrease, fairness between the TCP connections is achieved using the congestion avoidance method described above. The receive window 210 may also be reduced for fairness when the current available bandwidth $BW_A$ is less than a threshold.

Figure 4:
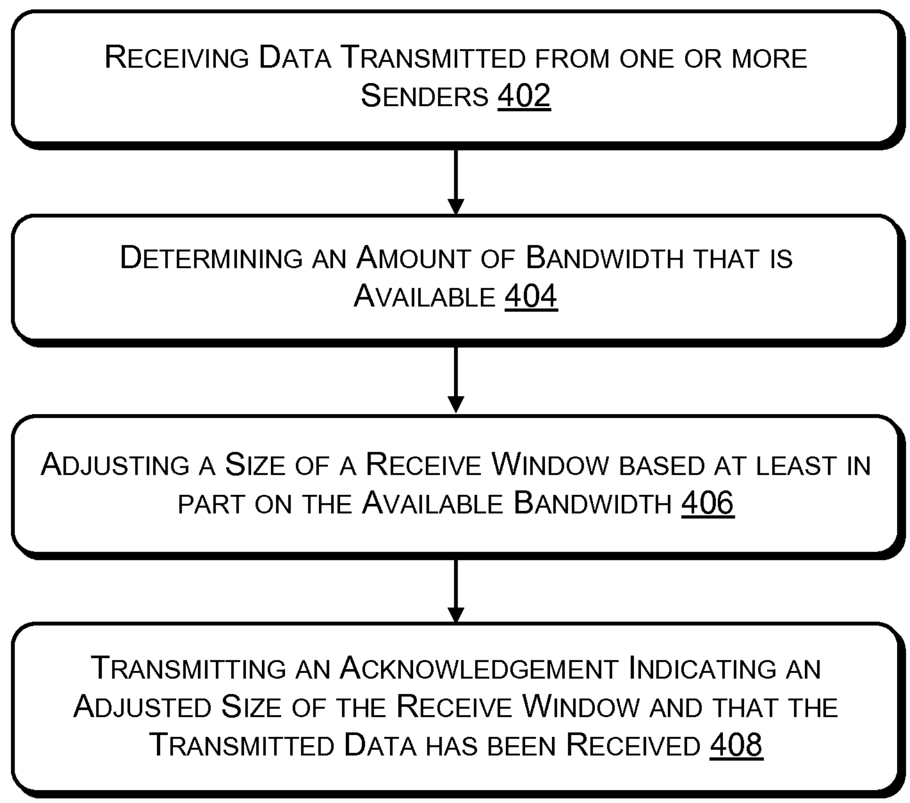
FIG. 4 illustrates a flowchart showing adjusting the size of a receive window based at least in part on an available bandwidth of a receiver, in accordance with various embodiments.
Figure 5:
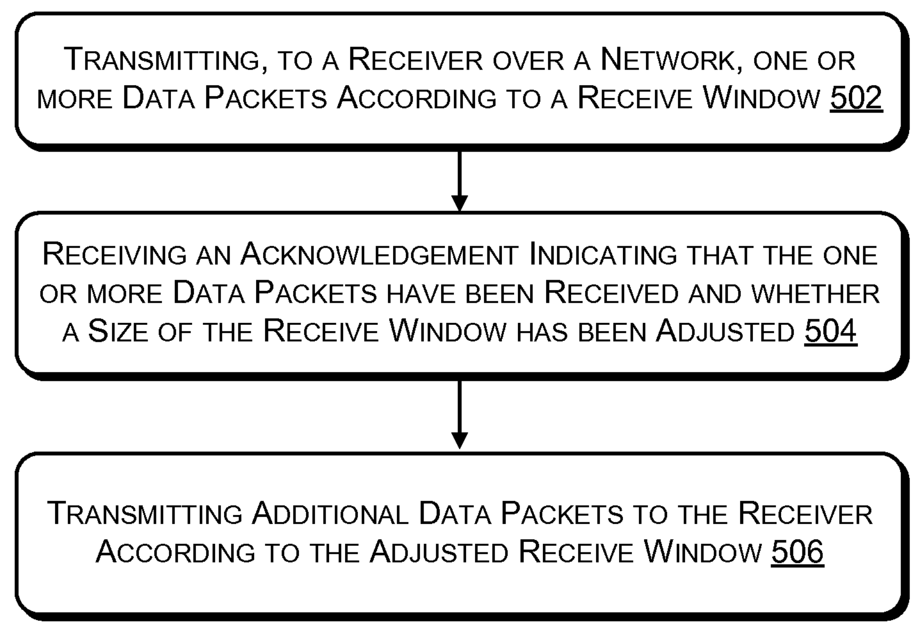
FIG. 5 illustrates a flowchart showing receiving an indication of an adjusted receive window from a receiver and transmitting data in accordance with the adjusted receive window, in accordance with various embodiments.

FIGS. 4 and 5 describe various example systems and/or processes for adjusting the size of a receive window based on available bandwidth. The example processes are described in the context of the environment of FIGS. 1-3, but are not limited to those environments. The order in which the operations are described in each example process is not intended to be construed as a limitation, and any number of the described blocks can be combined in any order and/or in parallel to implement each process. Moreover, the blocks in the FIGS. 4 and 5 may be operations that can be implemented in hardware, software, and a combination thereof. In the context of software, the blocks represent computer-executable instructions that, when executed by one or more processors, cause one or more processors to perform the recited operations. Generally, the computer-executable instructions may include routines, programs, objects, components, data structures, and the like that cause the particular functions to be performed or particular abstract data types to be implemented.

FIG. 4 is a flowchart illustrating adjusting the size of a receive window based on an available bandwidth of a receiver. In various embodiments, the following operations may be performed by a receiver, such as receiver 208, as illustrated in FIG. 2. Block 402 illustrates receiving data transmitted from one or more senders. In one embodiment, the sender may refer to the one or more senders 202-206 described with respect to FIG. 2. Moreover, the data may be any type of data known in the art and the data may be transmitted utilizing TCP. In addition, the one or more senders and/or the receiver may be included within a data center network and the one or more senders may transmit the data in parallel and/or at the same time.

Block 404 illustrates determining an amount of bandwidth that is available. More particularly, an available amount of bandwidth at the receiver may be determined. Moreover, the available bandwidth may depend upon an amount of data received by the receiver and/or a size of a receive window, such as receive window 210, for example, that is coupled to the receiver. That is, the available bandwidth of the receiver may be relatively low if the receiver has received a large amount of data, and vice versa.

Block 406 illustrates adjusting a size of a receive window based at least in part on the available bandwidth. As stated previously, the size of the receive window may determine the amount of data that can be transmitted to the receiver without the receiver needing to transmit an acknowledgement to the sender. In various embodiments, the receive window size may be increased when there is sufficient available bandwidth. Likewise, the receive window size may be decreased when bandwidth at the receiver is not available. In this embodiment, the decrease in size of the receive window may minimize an amount of incast congestion at the receiver that is caused by the data transmitted by the sender. In contrast, increasing the size of the receive window may minimize constraining the one or more senders from transmitting additional data to the receiver.

In the above embodiment, if it is determined that the receive window is to be increased, the receive window may be increased using a slow start method or a congestion avoidance method. In the slow start method, the size of the receive window may be doubled when available bandwidth exists at the receiver. Moreover, in congestion avoidance, the size of the receive window may be increased by one unit when available bandwidth does not exist at the receiver.

In another embodiment, the size of the receive window may be adjusted using a time-slotted system including one or more time slots, such as time slots 304-308. Moreover, the time slots may each include a first sub-slot and a second sub-slot, such as sub-slots 310-320. The first and second sub-slots of each time slot may have equal lengths. Utilizing the time-slotted system, the receiver may first measure traffic received at the first sub-slot. The receiver may then determine an available bandwidth at the first sub-slot based at least in part on a difference between the measured traffic and a total amount of bandwidth of the first sub-slot. Utilizing this available bandwidth, the receiver may then predict an available bandwidth at the second sub-slot and either increase or decrease the size of the receive window at the second sub-slot based at least in part on the predicted available bandwidth at the second sub-slot. In another embodiment, the size of the receive window may be based on a difference between a measured throughput and an expected throughput at the receiver.

Block 408 illustrates transmitting an acknowledgement indicating an adjusted size of the receive window and that the transmitted data has been received. In one embodiment the acknowledgement may refer to ACK 214. Moreover, upon the transmitted data being received by the receiver, the receiver may then transmit the acknowledgement to the sender. The acknowledgement may confirm that the transmitted data was actually received and/or indicate a size of the receive window. As such, if the size of the receive window has been adjusted, an acknowledgement following the receive window adjustment may include the new size of the receive window. Subsequently, the sender may transmit additional data packets according to the new size of the receive window. Therefore, at least one RTT may occur before the receiver receives data reflecting the adjusted receive window.

The foregoing operations with respect to FIG. 4 may help avoid and/or minimize incast congestion at a TCP receiver of a data center network. By avoiding and/or minimizing incast congestion before it occurs, packet loss and subsequent retransmission may also be avoided and/or minimized. Moreover, the techniques described above may also help avoid maintaining too small of a receive window, which may assist in avoiding and/or minimizing constraining a sender in a data center network. Accordingly, without such incast congestion and/or constraints on a system, the system may experience greater efficiency and/or performance.

FIG. 5 is a flowchart illustrating transmitting data in response to receiving an acknowledgement indicating a change in a size of a receive window. In various embodiments, the following operations may be performed by a sender, such as one of the one or more senders 202-206 shown in FIG. 2.

Block 502 illustrates transmitting, to a receiver over a network, one or more data packets according to a receive window. As stated above, the receiver and the receive window may correspond to receiver 208 and receive window 210, respectively. Moreover, one or more data packets may be transmitted to a receiver based on a known receive window that represents a maximum amount of data that can be transmitted to the receiver at a single time and/or without an acknowledgement being returned by the receiver. For example, if the receive window is set to two, each sender may transmit two data packets to the receiver without receiving an acknowledgement. If additional data packets were transmitted by one or more of the senders, incast congestion at the receiver may occur. Furthermore, these data packets may be transmitted over the network, such as a data center network, for example, using TCP.

Block 504 illustrates receiving an acknowledgement indicating that the one or more data packets have been received and whether a size of the receive window has been adjusted. The acknowledgement may refer to ACK 214 shown in FIG. 2. Therefore, the acknowledgement may notify the sender that transmitted data was received by the receiver. Moreover, because the acknowledgment may include a size of the receive window, the sender may be aware of how many data packets may be transmitted to the receiver at a particular time. If the size of the receive window has been adjusted, the acknowledgement will also indicate this information to the sender.

Block 506 illustrates transmitting additional data packets to the receiver according to the adjusted receive window. Provided that the size of the receive window was adjusted by the receiver, the sender may transmit additional data packets in accordance with the adjusted receive window. For instance, if the size of the receive window was changed from one to three, the sender may now transmit three data packets to the receiver at a single time. Further, as these additional packets may be sent in response to the adjusted receive window, the additional packets may be received by the receiver at least one RTT after the size of the receive window was changed. Following receipt of the additional data packets, the receiver may then transmit another acknowledgement to the sender, which may indicate that the additional data packets were in fact received. Moreover, this acknowledgement may indicate to the sender whether another receive window adjustment has been made.

Figure 6:
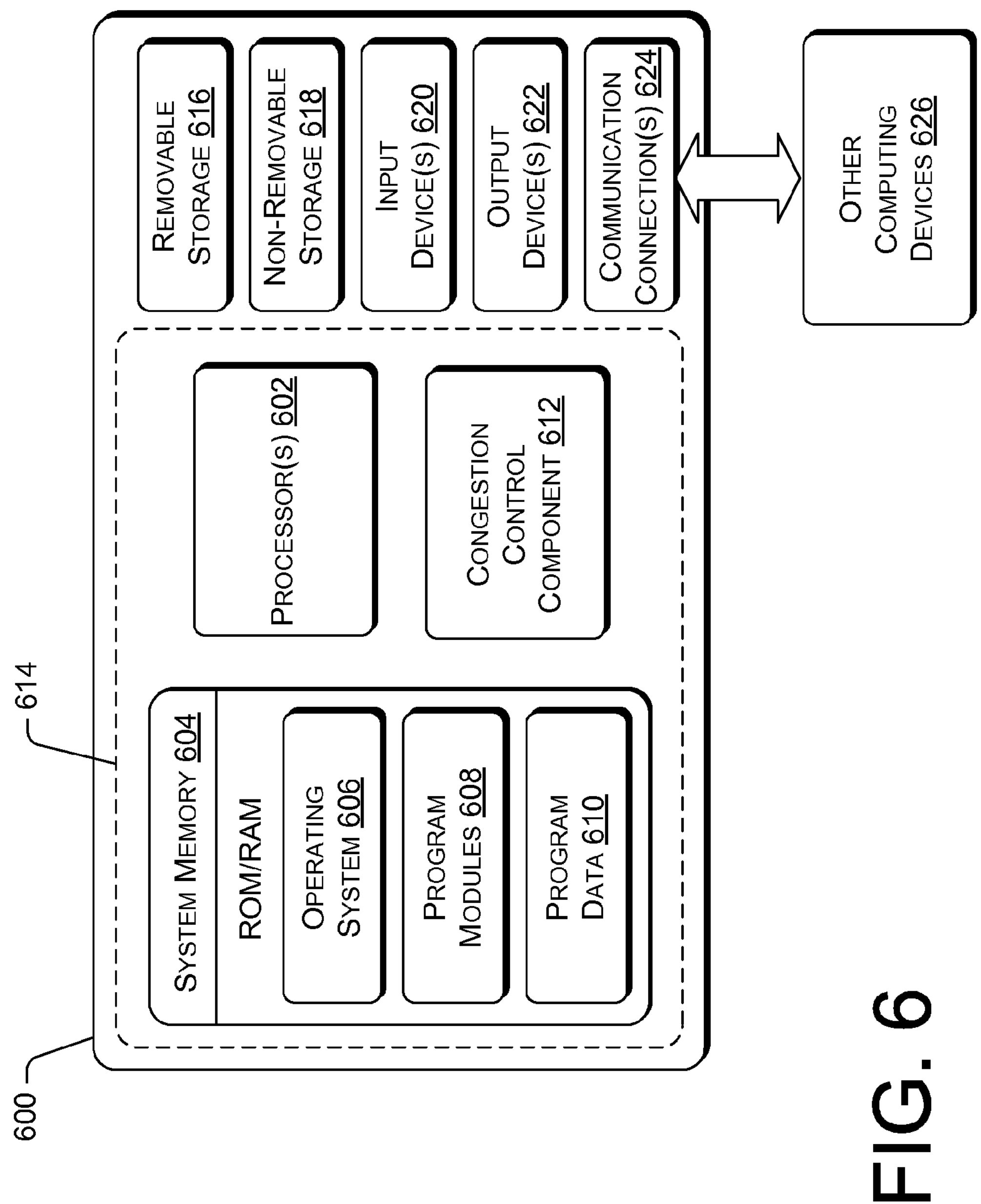
FIG. 6 is a block diagram that illustrates a representative computing device that may implement receive window adjustment techniques described herein, in accordance with various embodiments.

FIG. 6 illustrates a representative computing device 600 that may implement the incast congestion control techniques described herein, in accordance with various embodiments. The techniques and mechanisms described herein may be implemented by multiple instances of computing device 600 as well as by any other computing device, server, system, and/or environment. In some embodiments, the computing device 600 may correspond to the receiver 208, as described above with reference to FIG. 2. The computing device 600 shown in FIG. 6 is only one example of a computing device and is not intended to suggest any limitation as to the scope of use or functionality of any computing device utilized to perform the processes and/or procedures described above.

In at least one configuration, the computing device 600 includes at least one processor 602 and system memory 604. The processor(s) 602 may execute one or more modules and/or processes to cause the computing device 600 to perform a variety of functions. In some embodiments, the processor(s) 602 are a CPU, a GPU, both CPU and GPU, or other processing units or components known in the art. Additionally, each of the processor(s) 602 may possess its own local memory, which also may store program modules, program data, and/or one or more operating systems.

Depending on the exact configuration and type of the computing device 600, the system memory 604 may be volatile (such as RAM), non-volatile (such as ROM, flash memory, miniature hard drive, memory card, or the like) or some combination thereof. The system memory 604 may include an operating system 606, one or more program modules 608, and may include program data 610. The computing device 600 is of a very basic configuration demarcated by a dashed line 614. Again, a terminal may have fewer components but may interact with a computing device that may have such a basic configuration.

The computing device may also include a congestion control component 612. The congestion control component may perform the techniques, methods, and/or operations described above in reference to FIGS. 1-5. For instance, the congestion control component 612 may adjust the size of a receive window associated with a receiver to either avoid incast congestion and/or avoid constraining one or more senders from transmitting data to the receiver.

The computing device 600 may have additional features and/or functionality. For example, the computing device 600 may also include additional data storage devices (removable and/or non-removable) such as, for example, magnetic disks, optical disks, or tape. Such additional storage is illustrated in FIG. 6 by removable storage 616 and non-removable storage 618. Computer-readable media may include volatile and non-volatile, removable, and non-removable media implemented in any method or technology for storage of information, such as computer readable instructions, data structures, program modules, or other data. The system memory 604, the removable storage 616 and the non-removable storage 618 are all examples of computer-readable media and/or computer storage media. Computer storage media includes, but is not limited to, RAM, ROM, EEPROM, flash memory or other memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing device 600. Any such computer storage media may be part of the computing device 600. Moreover, the computer-readable media may include computer-executable instructions that, when executed by the processor(s) 602, perform various functions and/or operations described herein.

The computing device 600 may also have input device(s) 620 such as a keyboard, a mouse, a pen, a voice input device, a touch input device, etc. Output device(s) 622, such as a display, speakers, a printer, etc. may also be included.

The computing device 600 may also contain communication connections 624 that allow the device to communicate with other computing devices 626, such as over a network. These networks may include wired networks as well as wireless networks. The communication connections 624 are some examples of communication media. Communication media may typically be embodied by computer readable instructions, data structures, program modules, etc. In some embodiments, the other computing devices 626 may correspond to the servers 122-126 described above with reference to FIG. 1 and/or the senders 202-206 described above with reference to FIG. 2. Further, the other computing devices 626 may include a hardware component similar to the computing device 600 described above, and may include one or more modules for performing the functions described herein, such as the process described above with reference to FIG. 5.

It is appreciated that the illustrated computing device 600 is only one example of a suitable device and is not intended to suggest any limitation as to the scope of use or functionality of the various embodiments described. Other well-known computing devices, servers, systems, environments and/or configurations that may be suitable for use with the embodiments include, but are not limited to, personal computers, servers and/or server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The implementation and administration of a shared resource computing environment on a single computing device may enable multiple computer users to concurrently collaborate on the same computing task or share in the same computing experience without reliance on networking hardware such as, but not limited to, network interface cards, hubs, routers, servers, bridges, switches, and other components commonly associated with communications over the Internet, as well without reliance on the software applications and protocols for communication over the Internet.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The invention claimed is:

1. A system comprising:

a receiver that receives data transmitted from one or more senders over a network, and returns an acknowledgement to the one or more senders after the transmitted data is received; and a receive window associated with the receiver that determines a maximum amount of data that the one or more senders can transmit without receiving the acknowledgement, a size of the receive window being adjusted based on an available bandwidth of the receiver at a first sub-slot included within a time slot and a prediction of an available bandwidth of the receiver at a second sub-slot included within the time slot and that is subsequent in time to the first sub-slot.

2. A system as recited in claim 1, wherein the system further comprises a data center network that includes the one or more senders, the data and the acknowledgement being transmitted using Transmission Control Protocol.

3. A system as recited in claim 1, wherein the size of the receive window is increased to minimize constraining the one or more senders from transmitting additional data to the receiver.

4. A system as recited in claim 1, wherein the size of the receive window is decreased to minimize incast congestion at the receiver.

5. A system as recited in claim 1, wherein the acknowledgement indicates to the one or more senders the size of the receive window.

6. A system as recited in claim 1, wherein the prediction of the available bandwidth at the receiver is determined by:

measuring observed traffic at the first sub-slot included within the time slot;

identifying a total amount of bandwidth of the receiver;

determining, based at least in part on the observed traffic and the total amount of bandwidth, the available bandwidth at the first sub-slot; and predicting, based at least in part on the available bandwidth at the first sub-slot, an available bandwidth at the second sub-slot included within the time slot.

7. A system as recited in claim 6, wherein a size of a receive window at the second sub-slot is either increased or decreased based on the predicted available bandwidth at the second sub-slot.

8. A system as recited in claim 7, wherein the size of the receive window is doubled according to a slow start process or the size of the receive window is increased but not doubled according to a congestion avoidance process.

9. A system as recited in claim 1, wherein at least one round trip time occurs before the receiver receives data reflecting the adjusted size of the receive window.

10. A system as recited in claim 1, wherein the size of the receive window is adjusted based on a difference between a measured throughput and an expected throughput.

11. A method comprising:

receiving data transmitted from one or more senders;

determining, based on the transmitted data, an amount of bandwidth that is available at a first time sub-slot of a time slot;

predicting an amount of bandwidth that is available at a second time sub-slot of the time slot that is subsequent to the first time sub-slot and that has a length that is equal to the first time sub-slot;

adjusting, by a processor, a size of a receive window based at least in part on the determined amount of the available bandwidth at the first time sub-slot and the predicted amount of the available bandwidth at the second time sub-slot; and transmitting an acknowledgement indicating an adjusted size of the receive window and that the transmitted data has been received.

12. A method as recited in claim 11, further comprising:

increasing the size of the receive window in response to determining that there is sufficient available bandwidth; and decreasing the size of the receive window in response to determining that sufficient bandwidth is not available, the decreasing minimizing an amount of congestion caused by the received data.

13. A method as recited in claim 11, further comprising adjusting the size of the receive window using a time-slotted system including one or more time slots that includes the time slot.

14. A method as recited in claim 13, further comprising:

measuring traffic received at the first time sub-slot;

determining an available bandwidth at the first time sub-slot based at least in part on a difference between the measured traffic and a total amount of bandwidth of the first time sub-slot;

utilizing the available bandwidth at the first time sub-slot to predict an available bandwidth at the second time sub-slot; and increasing or decreasing the size of the receive window at the second time sub-slot based at least in part on the predicted available bandwidth at the second time sub-slot.

15. A method as recited in claim 11, further comprising adjusting the size of the receive window based on a difference between a measured throughput and an expected throughput at a receiver of the transmitted data.

16. A method comprising:

transmitting, to a receiver over a network, one or more data packets according to a known receive window that represents an amount of data that can be transmitted to the receiver at a single time;

receiving, by a processor, an acknowledgement indicating that the one or more data packets have been received, the acknowledgment further indicating whether a size of the receive window has been adjusted based on an available bandwidth of the receiver at a first sub-slot included within a time slot and a predicted available bandwidth of the receiver at a second sub-slot included within the time slot and that is subsequent in time to the first sub-slot, a length of the first sub-slot and the second sub-slot being equal; and transmitting additional data packets to the receiver according to the adjusted size of the receive window.

17. A method as recited in claim 16, wherein the additional data packets are received by the receiver at least one round trip time after the size of the receive window was adjusted.

18. A method as recited in claim 16, wherein the one or more data packets are transmitted and the acknowledgement is received using Transmission Control Protocol.

19. A method as recited in claim 16, further comprising causing congestion at a receiver of the one or more data packets in response to determining that the additional data packets exceed a size of the adjusted size of the receive window.

20. A method as recited in claim 16, further comprising receiving, in response to transmitting the additional data packets, a second acknowledgement indicating that the additional data packets are received.

* * * * *